United States Patent
Yu et al.

(10) Patent No.: US 12,362,670 B2
(45) Date of Patent: Jul. 15, 2025

(54) SWITCHING REGULATOR AND CONTROL CIRCUIT AND CONTROL METHOD THEREOF

(71) Applicant: Richtek Technology Corporation, Hsinchu (TW)

(72) Inventors: Pao-Hsun Yu, Taipei (TW); Shei-Chie Yang, Hsinchu (TW); Yuan-Yen Mai, Hsinchu (TW); Cheng-Hung Hsu, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 231 days.

(21) Appl. No.: 18/358,037

(22) Filed: Jul. 25, 2023

(65) Prior Publication Data
US 2024/0072667 A1   Feb. 29, 2024

(30) Foreign Application Priority Data
Aug. 26, 2022   (TW) .................................. 111132366

(51) Int. Cl.
*H02M 3/158* (2006.01)
*H02M 1/088* (2006.01)
*H02M 3/07* (2006.01)

(52) U.S. Cl.
CPC .......... *H02M 3/158* (2013.01); *H02M 1/088* (2013.01); *H02M 3/07* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155;
(Continued)

(56) References Cited

U.S. PATENT DOCUMENTS 8,854,020 B2 * 10/2014 Peron .................. H02M 3/1588
                                                              323/272
9,270,170 B2 *  2/2016 Divan .................. H02M 3/156

* cited by examiner

*Primary Examiner* — Jeffrey A Gblende
(74) *Attorney, Agent, or Firm* — Huan-Yi Lin

(57) ABSTRACT

A switching regulator includes a boost power stage circuit and a control circuit. The boost power stage circuit includes: at least one power switch configured to switch a terminal of an inductor according to an operation signal during a normal operation period, such that the terminal of the inductor is switched between an output voltage and ground level; and a power line switch connected in series to the inductor between the input voltage and the output voltage. The power line switch is turned OFF when the output voltage is short to ground level, to prevent a short current from flowing from input voltage to ground level. The control circuit generates the operation signal according to the output voltage and determines whether the power line switch is P-type or N-type MOS device, so as to turn OFF the power line switch when the output voltage is short to ground level.

25 Claims, 10 Drawing Sheets

(58) Field of Classification Search
CPC ...... H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

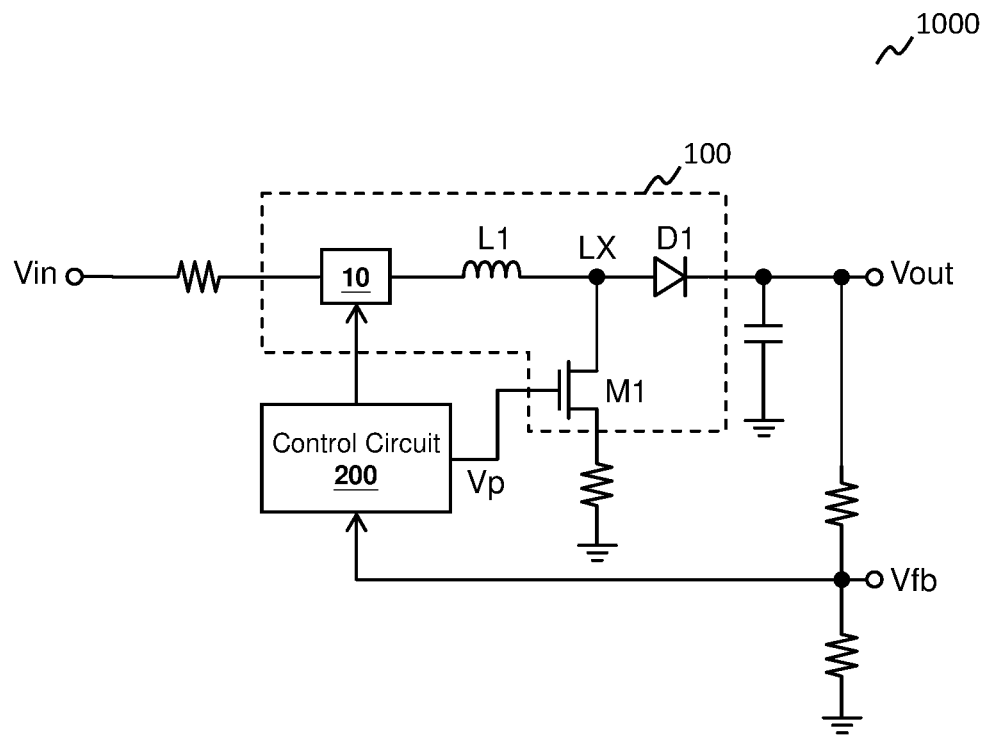
Fig. 1A
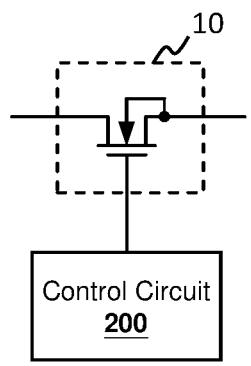 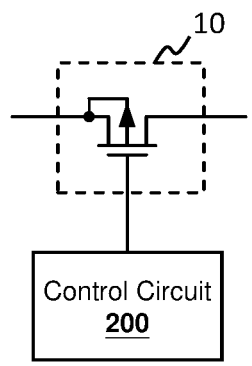
Fig. 1B　　　　　　　　　　Fig. 1C

SWITCHING REGULATOR AND CONTROL CIRCUIT AND CONTROL METHOD THEREOF

CROSS REFERENCE

The present invention claims priority to TW 111132366 filed on Aug. 26, 2022.

BACKGROUND OF THE INVENTION

Field of Invention

The present invention relates to a switching regulator; particularly, it relates to a switching regulator which is capable of determining different types of power line switches, so as to select different corresponding driver circuits. The present invention also relates to a control circuit and a control method of such switching regulator.

Description of Related Art

A conventional switching regulator, in particular one having a boost power stage circuit, typically has a power line switch. In such conventional switching regulator, the power line switch is turned off when the output voltage is short to ground level, so as to prevent a short current from flowing from the input voltage to ground level via the output voltage, which may damage a load which is coupled to the output voltage and receives power supply from the output voltage. The aforementioned power line switch can be a P-type metal oxide semiconductor (MOS) device or an N-type MOS device.

The prior art switching regulator has the following drawback. The control circuit of the prior art switching regulator can only support one type of the MOS device power line switch. That is, if the control circuit supports the P-type MOS device power line switch, the power line switch can only be implemented as a P-type MOS device, but not N-type MOS device; on the other hand, if the control circuit supports the N-type MOS device power line switch, the power line switch can only be implemented as an N-type MOS device, but not P-type MOS device. Consequently and undesirably, the prior art switching regulator flexibly support any type of the power line switches, thus limiting the application scope of the prior art switching regulator.

In view of the above, to overcome the drawback in the prior art, the present invention proposes a switching regulator which is adaptive to different types of power line switches.

SUMMARY OF THE INVENTION

From one perspective, the present invention provides a switching regulator comprising: a boost power stage circuit including: at least one power switch, which is configured to operably switch a terminal of an inductor according to an operation signal during a normal operation period, such that the terminal of the inductor is switched between an output voltage and ground level, thereby converting an input voltage to the output voltage; and a power line switch connected in series to the inductor between the input voltage and the output voltage, wherein the power line switch is turned OFF when the output voltage is short to ground level, so as to prevent a short current from flowing from the input voltage to ground level; and a control circuit, which is configured to operably generate the operation signal according to the output voltage and determine whether the power line switch is a P-type metal oxide semiconductor (MOS) device or an N-type MOS device, so as to turn OFF the power line switch when the output voltage is short to ground level.

In one embodiment, the control circuit includes: an operation signal generation circuit coupled to the boost power stage circuit, wherein the operation signal generation circuit is configured to operably generate the operation signal according to the output voltage; a conductivity type determination circuit coupled to the power line switch, wherein the conductivity type determination circuit is configured to operably determine whether the power line switch is a P-type MOS device or an N-type MOS device according to a sensing signal during a determination period, and is configured to operably generate a determination signal accordingly; and a gate driver circuit, which is configured to operably select one of a PMOS driver circuit and an NMOS driver circuit in the gate driver circuit according to the determination signal during the normal operation period, so as to operate the power line switch, and the gate driver circuit is configured to operably turn off the power line switch when the output voltage is short to ground level.

In one embodiment, the sensing signal includes one of or a combination of signals including one of the following: a gate voltage of the power line switch; an output voltage related signal; an input current related signal; or an inductor current related signal.

In one embodiment, the PMOS driver circuit includes: an IR clamping gate driver, a diode clamping gate driver or a pull ground gate driver.

In one embodiment, the PMOS driver circuit includes: a current source coupled between a gate of the power line switch and ground level, wherein the current source is configured to operably generate a sinking current flowing to ground level during the determination period, so as to generate the sensing signal; wherein when the sensing signal indicates that the power line switch is ON, the conductivity type determination circuit determines that the power line switch is the P-type MOS device, whereby the gate driver circuit selects the PMOS driver circuit to operate the power line switch, and when the output voltage is short to ground level, the gate driver circuit disables the PMOS driver circuit to turn OFF the power line switch; wherein when the sensing signal indicates that the power line switch is OFF, the conductivity type determination circuit determines that the power line switch is the N-type MOS device, whereby the gate driver circuit selects the NMOS driver circuit to operate the power line switch, and when the output voltage is short to ground level, the gate driver circuit disables the NMOS driver circuit to turn OFF the power line switch.

In one embodiment, the NMOS driver circuit includes: a charge pump gate driver.

In one embodiment, the charge pump gate driver is coupled between a gate of the power line switch and ground level, wherein the charge pump gate driver is configured to operably generate a test voltage which is applied to the gate of the power line switch during the determination period, so as to generate the sensing signal; wherein when the sensing signal indicates that the power line switch is ON, the conductivity type determination circuit determines that the power line switch is the N-type MOS device, whereby the gate driver circuit selects the NMOS driver circuit to operate the power line switch, and when the output voltage is short to ground level, the gate driver circuit disables the NMOS driver circuit to turn OFF the power line switch; wherein when the sensing signal indicates the power line switch is OFF, the conductivity type determination circuit determines that the power line switch is the P-type MOS device, whereby the gate driver circuit selects the PMOS driver circuit to operate the power line switch, and when the output voltage is short to ground level, the gate driver circuit disables the PMOS driver circuit to turn OFF the power line switch.

In one embodiment, the control circuit is configured to operably determine whether the output voltage is short to ground level according to an output voltage related signal and/or an inductor current related signal during the normal operation period.

In one embodiment, the control circuit is configured to operably determine whether the power line switch is the P-type MOS device or the N-type MOS device according to an external signal, an interface signal, or a memory signal.

In one embodiment, the conductivity type determination circuit compares the sensing signal with a reference signal corresponding to the sensing signal, to generate the determination signal.

From another perspective, the present invention provides a control circuit, which is configured to operably a switching regulator; the control circuit comprising: an operation signal generation circuit coupled to a boost power stage circuit of the switching regulator, wherein the operation signal generation circuit is configured to operably generate an operation signal according to an output voltage during a normal operation period, so as to switch at least one power switch of the boost power stage circuit, such that a terminal of an inductor is switched between the output voltage and ground level, thereby converting an input voltage to the output voltage; a conductivity type determination circuit coupled to the power line switch of the boost power stage circuit, wherein the conductivity type determination circuit is configured to operably determine whether the power line switch is a P-type metal oxide semiconductor (MOS) device or an N-type MOS device according to a sensing signal during a determination period, and is configured to operably generate a determination signal accordingly; and a gate driver circuit, which is configured to operably select one of a PMOS driver circuit and an NMOS driver circuit in the gate driver circuit according to the determination signal during the normal operation period, so as to operate the power line switch, and the gate driver circuit is configured to operably turn off the power line switch when the output voltage is short to ground level; wherein the power line switch is connected in series to the inductor between the input voltage and the output voltage, and when the output voltage is short to ground level, the power line switch is turned OFF to prevent a short current from flowing from the input voltage to ground level.

From yet another perspective, the present invention provides a control method, which is configured to operably a switching regulator; the control method comprising steps of: generating an operation signal according to an output voltage during a normal operation period, so as to switch at least one power switch of a boost power stage circuit in the switching regulator, such that a terminal of an inductor is switched between the output voltage and ground level, thereby converting an input voltage to the output voltage; determining whether the power line switch of the boost power stage circuit is a P-type metal oxide semiconductor (MOS) device or an N-type MOS device according to a sensing signal during a determination period, to generate a determination signal; and selecting one of a PMOS driver circuit and an NMOS driver circuit in the gate driver circuit according to the determination signal during the normal operation period, so as to operate the power line switch and to turn off the power line switch when the output voltage is short to ground level; wherein the power line switch is connected in series to the inductor between the input voltage and the output voltage, wherein when the output voltage is short to ground level, the power line switch is turned OFF to prevent a short current from flowing from the input voltage to ground level.

In one embodiment, the step of determining whether the power line switch of the boost power stage circuit is the P-type MOS device or the N-type MOS device according to a sensing signal during the determination period to generate the determination signal includes: generating a sinking current flowing to ground level during the determination period, so as to generate the sensing signal; wherein when the sensing signal indicates that the power line switch is ON, determining that the power line switch is the P-type MOS device, and selecting the PMOS driver circuit to operate the power line switch, wherein when the output voltage is short to ground level, the PMOS driver circuit is disabled to turn OFF the power line switch; wherein when the sensing signal indicates that the power line switch is OFF, determining that the power line switch is the N-type MOS device, and selecting the NMOS driver circuit to operate the power line switch, wherein when the output voltage is short to ground level, the NMOS driver circuit is disabled to turn OFF the power line switch.

In one embodiment, the step of determining whether the power line switch of the boost power stage circuit is the P-type MOS device or the N-type MOS device according to a sensing signal during the determination period to generate the determination signal includes: generating a test voltage which is applied to the gate of the power line switch during the determination period, so as to generate the sensing signal; wherein when the sensing signal indicates that the power line switch is ON, determining that the power line switch is the N-type MOS device, and selecting the NMOS driver circuit to operate the power line switch, wherein when the output voltage is short to ground level, the NMOS driver circuit is disabled to turn OFF the power line switch; wherein when the sensing signal indicates that the power line switch is OFF, determining that the power line switch is the P-type MOS device, and selecting the PMOS driver circuit to operate the power line switch, wherein when the output voltage is short to ground level, the PMOS driver circuit is disabled to turn OFF the power line switch.

In one embodiment, the step of determining whether the power line switch of the boost power stage circuit is the P-type MOS device or the N-type MOS device according to a sensing signal during the determination period to generate the determination signal includes: comparing the sensing signal with a reference signal corresponding to the sensing signal, to generate the determination signal.

The objectives, technical details, features, and effects of the present invention will be better understood with regard to the detailed description of the embodiments below, with reference to the attached drawings.

BRIEF DESCRIPTION OF THE DRAWINGS

FIG. 1A shows a schematic diagram of a switching regulator according to an embodiment of the present invention.

FIG. 1B and FIG. 1C show schematic diagrams of two different embodiments of a power line switch in a switching regulator, respectively.

FIG. 6A illustrates a signal waveform diagram depicting the operation of a switching regulator of FIG. 4 during a determination period according to an embodiment of the present invention, whereas.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Please refer to FIG. 1A, which shows a schematic diagram of a switching regulator according to an embodiment of the present invention. In one embodiment, the switching regulator 1000 comprises: a boost power stage circuit 100 and a control circuit 200. In one embodiment, the boost power stage circuit 100 includes: at least one power switch, an inductor L1 and a power line switch 10. In this embodiment, the at least one power switch of the boost power stage circuit 100 includes a diode D1 and a transistor M1, wherein the diode D1 and the transistor M1 are configured to operably switch one terminal of the inductor L1 (in this embodiment, this terminal is the one which is electrically connected to the node LX) according to an operation signal Vp during a normal operation period, such that this terminal of the inductor L1 is switched between the output voltage Vout and ground level, thereby converting an input voltage Vin to the output voltage Vout. In one embodiment, the power line switch 10 is connected in series with the inductor L1 between the input voltage Vin and the output voltage Vout. The power line switch 10 is turned OFF when the output voltage Vout is short to ground level, so as to prevent a short current from flowing from the input voltage Vin to ground level through the output voltage Vout, which may damage a load (not shown, wherein the load is coupled to the output voltage Vout and receives power supply from the output voltage Vout). The control circuit 200 is configured to operably generate the operation signal Vp according to a feedback signal Vfb related to the output voltage Vout, to control the transistor M1 to switch according to a duty ratio of the operation signal Vp. Besides, the control circuit 200 further determines whether the power line switch is a P-type metal oxide semiconductor (MOS) device or an N-type MOS device, and turns OFF the power line switch 10 when the output voltage Vout is short to ground level.

Please refer to FIG. 1A together with FIG. 1B and FIG. 1C. FIG. 1B and FIG. 1C show schematic diagrams of two different embodiments of a power line switch in a switching regulator, respectively. In one embodiment, the power line switch 10 can be an NMOS device as shown in FIG. 1B. In another embodiment, the power line switch 10 can be a PMOS device as shown in FIG. 1C. The control circuit 200 is configured to be able to determine whether the power line switch is an NMOS device or a PMOS device and the control circuit 200 can operate correspondingly according to the conductivity type of the power line switch 10.

Figure 2:
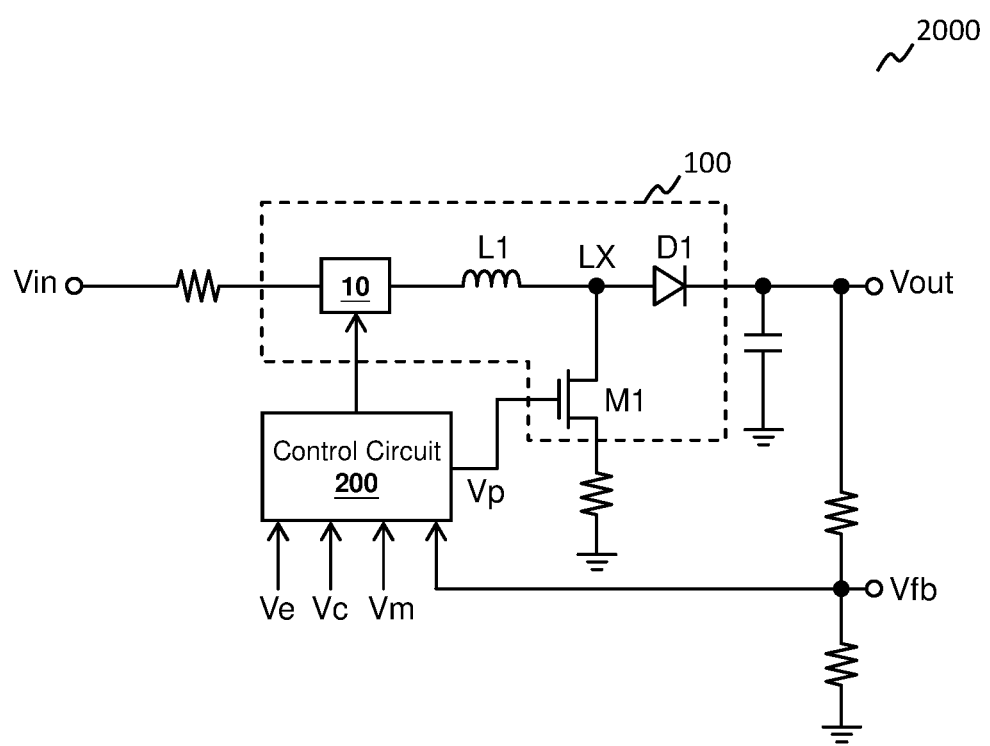
FIG. 2 shows a schematic diagram of a switching regulator according to an embodiment of the present invention.

Please refer to FIG. 2, which shows a schematic diagram of a switching regulator according to an embodiment of the present invention. The switching regulator 2000 of this embodiment shown in FIG. 2 is similar to the switching regulator 1000 of the embodiment shown in FIG. 1A. In one embodiment, the control circuit 200 is configured to operably determine whether the power line switch 10 is a P-type MOS device or an N-type MOS device according to an external signal Ve, an interface signal Vc, or a memory signal Vm and the control circuit 200 can operate correspondingly.

In one embodiment, the external signal Ve can be, for example but not limited to, a command supplied by an external circuit to directly indicate whether the power line switch 10 is a PMOS device or an NMOS device. The interface signal Vc can be supplied by, for example but not limited to, a communication interface such as a Serial Peripheral Interface (SPI) or an INTER IC BUS (I2C), wherein after the communication interface receives a signal indicating whether the power line switch 10 is a PMOS device or an NMOS device, the communication interface supplies the interface signal Vc to the control circuit 200. The memory signal Vm can be supplied by, for example but not limited to, a memory circuit, wherein such memory circuit has a memory which stores relevant information indicating whether the power line switch 10 is a PMOS device or an NMOS device, and the memory circuit transmits the memory signal Vm to the control circuit 200 according to the aforementioned relevant information.

Figure 3:
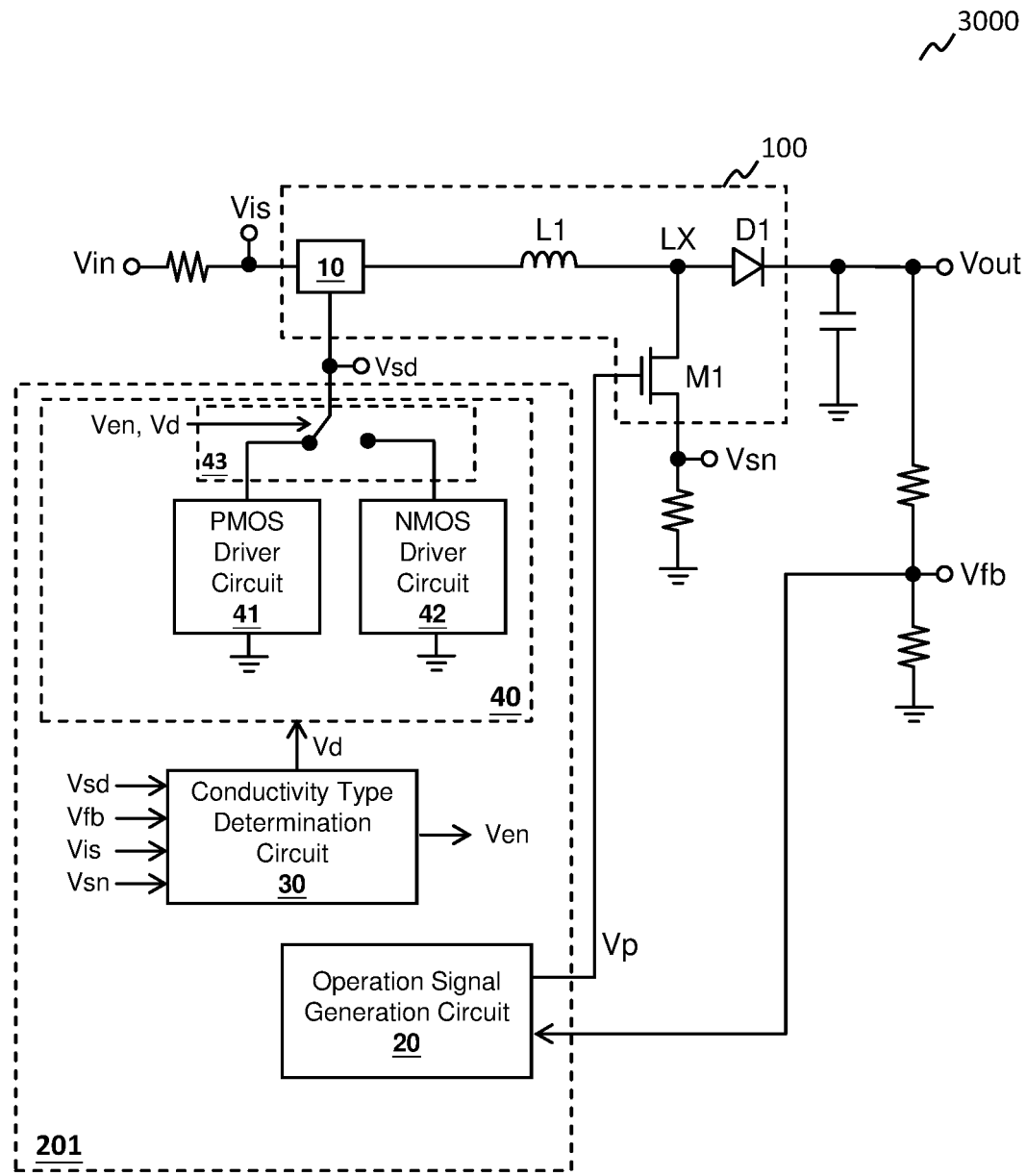
FIG. 3 shows a schematic diagram of a switching regulator according to an embodiment of the present invention.

Please refer to FIG. 3, which shows a schematic diagram of a switching regulator according to an embodiment of the present invention. The switching regulator 3000 of this embodiment shown in FIG. 3 is similar to the switching regulator 1000 of the embodiment shown in FIG. 1A. In one embodiment, a control circuit 201 of the switching regulator 3000 includes: an operation signal generation circuit 20, a conductivity type determination circuit 30 and a gate driver circuit 40. In one embodiment, the operation signal generation circuit 20 is coupled to a boost power stage circuit 100, wherein the operation signal generation circuit is configured to operably generate an operation signal Vp according to a feedback signal Vfb related to the output voltage Vout, to control the transistor M1 to switch according to a duty ratio of the operation signal Vp. In one embodiment, the conductivity type determination circuit 30 is coupled to a power line switch 10 via the gate driver circuit 40, wherein the conductivity type determination circuit 30 is configured to operably determine whether the power line switch 10 is a P-type MOS device or an N-type MOS device according to a sensing signal during a determination period, to generate a determination signal Vd. In one embodiment, the sensing signal includes one of or a combination of signals including one of the following: a gate voltage Vsd of the power line switch 10; an output voltage related signal, such as the feedback signal Vfb related to the output voltage Vout; an input current related signal Vis; or an inductor current related signal Vsn.

The gate voltage Vsd can be for example a gate voltage of an NMOS device or a gate voltage of a PMOS device. The input current related signal Vis can be for example a voltage after the input voltage Vin passes through a resistor, as shown in FIG. 3. The inductor current related signal Vsn can be for example a voltage drop across a resistor coupled between the transistor M1 and ground level, as shown in FIG. 3.

In one embodiment, the gate driver circuit 40 includes: a PMOS driver circuit 41, an NMOS driver circuit 42 and a selection circuit 43. The gate driver circuit 40 is configured to operably select one of a PMOS driver circuit 41 and an NMOS driver circuit 42 in the gate driver circuit 40 according to the determination signal Vd during a normal operation period, so as to operate the power line switch 10, and when the output voltage Vout is short to ground level, the gate driver circuit 40 turns off the power line switch 10. In one embodiment, the selection circuit 43 can be, for example but not limited to, a switch shown in FIG. 3, wherein such switch (i.e. the selection circuit 43) is switched according to an enable signal Ven or the determination signal Vd, so as to select to electrically connect the PMOS driver circuit 41 to the power line switch 10 or to electrically connect the NMOS driver circuit 42 to the power line switch 10. In one embodiment, the control circuit 201 determines whether the output voltage Vout is short to ground level according to the feedback signal Vfb and/or the inductor current related signal Vsn during the normal operation period.

In one embodiment, the conductivity type determination circuit 30 generates an enable signal Ven during a determination period, so as to enable the PMOS driver circuit 41 or the NMOS driver circuit 42 for a test period. Besides, during the test period, the conductivity type determination circuit 30 generates the determination signal Vd by comparing the gate voltage Vsd of the power line switch 10 with a corresponding reference signal, by comparing the feedback signal Vfb with a corresponding reference signal, by comparing the input current related signal Vis with a corresponding reference signal and/or by comparing the inductor current related signal Vsn with a corresponding reference signal, wherein the determination signal Vd indicates whether the power line switch 10 is a PMOS device or an NMOS device.

Figure 4:
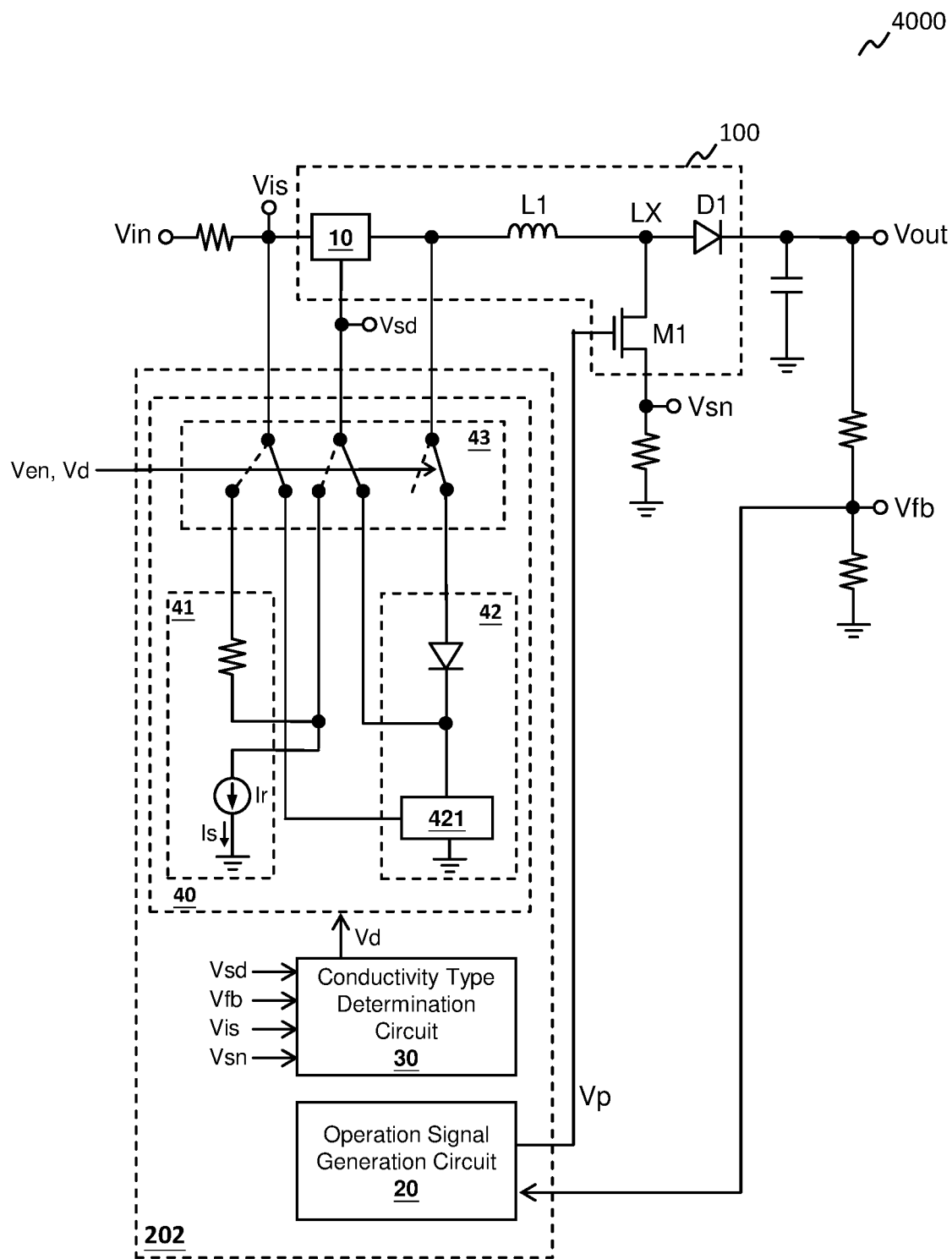
FIG. 4 shows a schematic diagram of a switching regulator according to a specific embodiment of the present invention.

Please refer to FIG. 4, which shows a schematic diagram of a switching regulator according to a specific embodiment of the present invention. The switching regulator 4000 of this embodiment shown in FIG. 4 is similar to the switching regulator 3000 of the embodiment shown in FIG. 3. In this embodiment, in a control circuit 202 of the switching regulator 4000, the gate driver circuit 40 includes: a PMOS driver circuit 41, an NMOS driver circuit 42 and a selection circuit 43. FIG. 4 shows a specific embodiment of the PMOS driver circuit (i.e. the PMOS driver circuit 41), which includes: a current source Ir coupled between the gate of the power line switch 10 and ground level, and a resistor coupled between a source of the power line switch 10 and a drain of the power line switch 10. During a determination period, when the enable signal Ven selects to electrically connect the PMOS driver circuit 41 to the power line switch 10 (i.e., in a case when the enable signal Ven enables the PMOS driver circuit 41), the current source Ir generates a sinking current Is flowing to ground level during the determination period. In the switching regulator 4000, the gate voltage Vsd of the power line switch 10, the output voltage related signal (e.g., the feedback signal Vfb related to the output voltage Vout), the input current related signal Vis and/or the inductor current related signal Vsn, or a combination of signals including one of the above signals, serves as the sensing signal. The conductivity type determination circuit 30 generates the determination signal Vd by comparing a gate voltage Vsd of the power line switch 10 with a corresponding reference signal, by comparing the output voltage related signal (e.g., the feedback signal Vfb related to the output voltage Vout) with a corresponding reference signal, by comparing an input current related signal Vis with a corresponding reference signal and/or by comparing an inductor current related signal Vsn with a corresponding reference signal, wherein the determination signal Vd indicates whether the power line switch 10 is a PMOS device or an NMOS device.

In this embodiment, the NMOS driver circuit 42 of the gate driver circuit 40 shown in FIG. 4 includes: a charge pump gate driver 421 and a diode. The charge pump gate driver 421 is coupled between the gate of the power line switch 10 and ground level. During a determination period, when the enable signal Ven selects to electrically connect the NMOS driver circuit 42 to the power line switch 10 (i.e., in a case when the enable signal Ven enables the NMOS driver circuit 42), the charge pump gate driver 421 generates a test voltage which is applied to the gate of the power line switch 10 during the determination period. In the switching regulator 4000, the gate voltage Vsd of the power line switch 10, the output voltage related signal (e.g., the feedback signal Vfb related to the output voltage Vout), the input current related signal Vis and/or the inductor current related signal Vsn, or a combination of signals including one of the above signals, serves as the sensing signal. The conductivity type determination circuit 30 generates the determination signal Vd by comparing a gate voltage Vsd of the power line switch 10 with a corresponding reference signal, by comparing the output voltage related signal (e.g., the feedback signal Vfb related to the output voltage Vout) with a corresponding reference signal, by comparing an input current related signal Vis with a corresponding reference signal and/or by comparing an inductor current related signal Vsn with a corresponding reference signal, wherein the determination signal Vd indicates whether the power line switch 10 is a PMOS device or an NMOS device.

Figure 5:
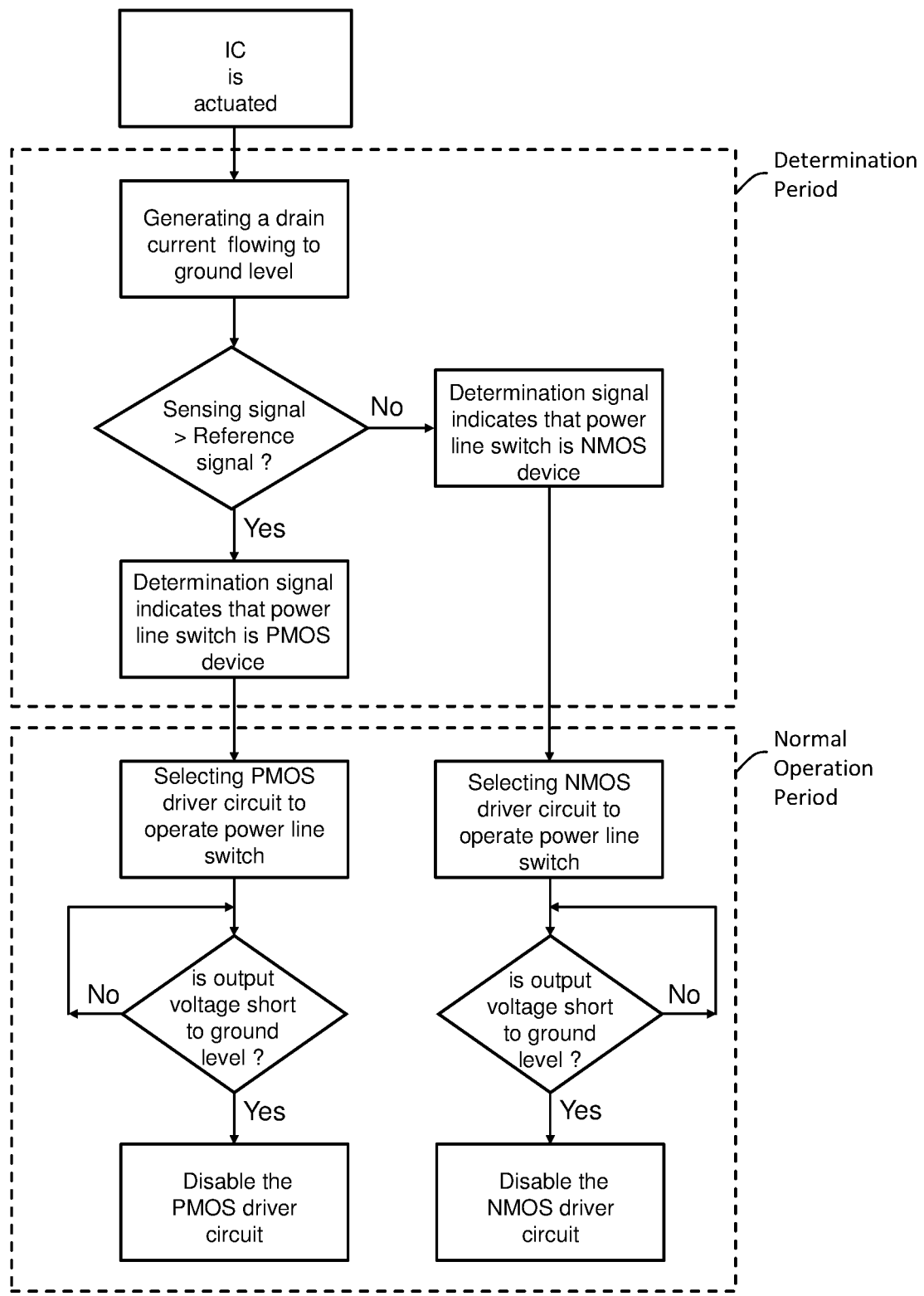
FIG. 5 shows a flowchart diagram of a control method corresponding to a switching regulator of FIG. 4 according to a specific embodiment of the present invention.

Please refer to FIG. 4 together with FIG. 5. FIG. 5 shows a flowchart diagram of a control method corresponding to the switching regulator of FIG. 4 according to a specific embodiment of the present invention. In one specific embodiment, during a determination period, the control circuit 202 of FIG. 4 operates the PMOS driver circuit 41, to determine a conductivity type of the power line switch 10. Subsequently, during a normal operation period, the control circuit 202 of FIG. 4 selects to operate the PMOS driver circuit 41 or the NMOS driver circuit 42 according to the conductivity type of the power line switch 10. Specific operation procedures of this embodiment are elaborated as following:

After an integrated circuit (IC) of the switching regulator 4000 is actuated, the switching regulator 4000 enters a determination period. First, the current source Ir generates a sinking current Is flowing to ground level during the determination period, so as to generate the sensing signal. Next, when the sensing signal indicates that the power line switch 10 is ON, the conductivity type determination circuit 30 determines that the power line switch 10 is the P-type MOS device, whereby the gate driver circuit 40 selects the PMOS driver circuit 41 to operate the power line switch 10 during the normal operation period. The conductivity type determination circuit 30 also determines whether the output voltage Vout is short to ground level; when the output voltage Vout is short to ground level, the PMOS driver circuit 41 is disabled and the power line switch 10 is turned OFF, so as to prevent the load from being damaged. When the output voltage Vout is not short to ground level, the gate driver circuit 40 keeps selecting the PMOS driver circuit 41 to operate the power line switch 10 and keeps determining whether the output voltage Vout is short to ground level. On the other hand, when the sensing signal indicates that the power line switch 10 is OFF, the conductivity type determination circuit 30 determines that the power line switch 10 is the N-type MOS device, whereby the gate driver circuit 40 selects the NMOS driver circuit 42 to operate the power line switch 10 during the normal operation period, and the conductivity type determination circuit 30 also determines whether the output voltage Vout is short to ground level. when the output voltage Vout is short to ground level, the NMOS driver circuit 42 is disabled and the power line switch 10 is turned OFF, so as to prevent the load from being damaged. When the output voltage Vout is not short to ground level, the gate driver circuit 40 keeps selecting the NMOS driver circuit 42 to operate the power line switch 10 and keeps determining whether the output voltage Vout is short to ground level.

Figure 6A:
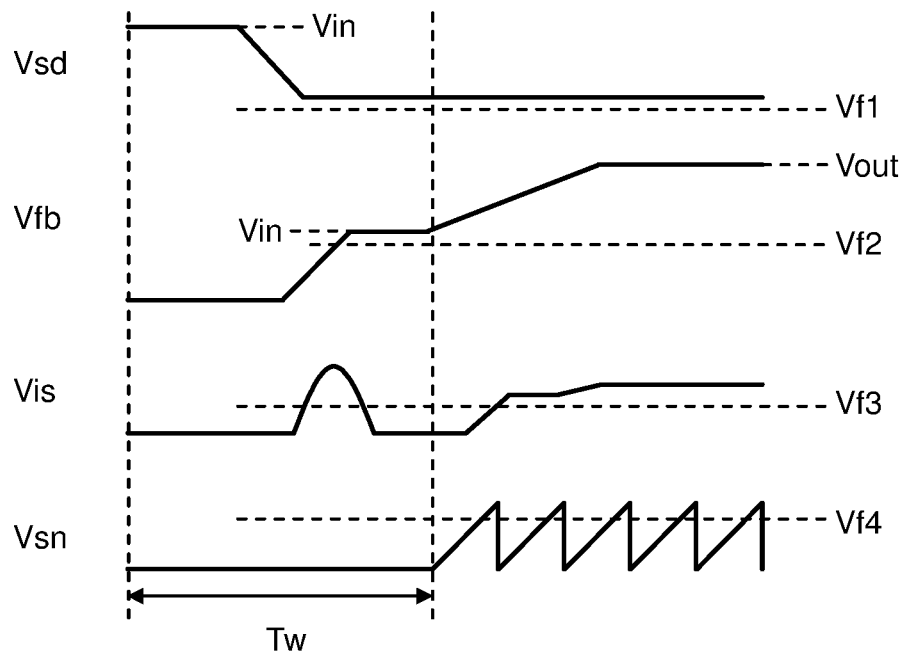
Figure 6B:
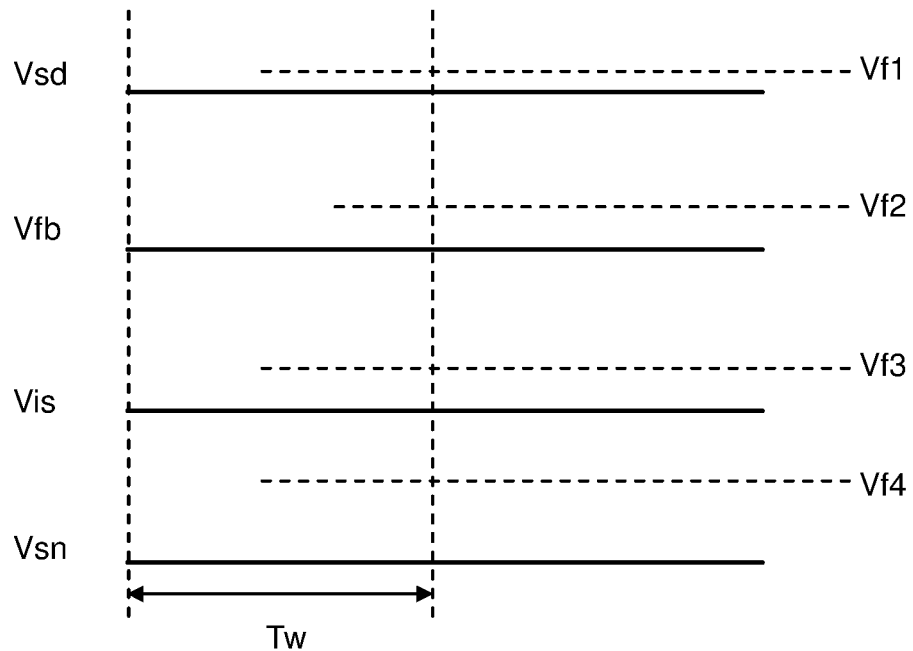
FIG. 6B illustrates a signal waveform diagram depicting the operation of a switching regulator of FIG. 4 during a determination period according to another embodiment of the present invention.

Please refer to FIG. 6A along with FIG. 6B. FIG. 6A illustrates a signal waveform diagram depicting the operation of the switching regulator of FIG. 4 during a determination period according to an embodiment of the present invention, whereas, FIG. 6B illustrates a signal waveform diagram depicting the operation of the switching regulator of FIG. 4 during a determination period according to another embodiment of the present invention. Referring to the embodiments shown in FIG. 4 and FIG. 5, when the enable signal Ven enables the PMOS driver circuit 41 and when the sensing signal indicates that the power line switch 10 is ON, the corresponding signal waveform diagram is as shown in FIG. 6A. To elaborate in more detail, when the gate voltage Vsd of the power line switch 10 is higher than a corresponding reference signal Vf1, when the feedback signal Vfb is higher than a corresponding reference signal Vf2, when the input current related signal Vis is higher than a corresponding reference signal Vf3 and/or when the inductor current related signal Vsn is higher than a corresponding reference signal Vf4, the sensing signal indicates that the power line switch 10 is ON. In this case, the conductivity type determination circuit 30 determines that the power line switch 10 is the P-type MOS device and generates the determination signal Vd, whereby the gate driver circuit 40 selects the PMOS driver circuit 41 to operate the power line switch 10 according to the determination signal Vd during the normal operation period. On the other hand, in the aforementioned embodiments shown in FIG. 4 and FIG. 5, when the sensing signal indicates that the power line switch 10 is OFF, the corresponding signal waveform diagram is as shown in FIG. 6B. To elaborate in more detail, when the gate voltage Vsd of the power line switch 10 is lower than the corresponding reference signal Vf1, when the feedback signal Vfb is lower than the corresponding reference signal Vf2, when the input current related signal Vis is lower than the corresponding reference signal Vf3 and/or when the inductor current related signal Vsn is lower than the corresponding reference signal Vf4, the sensing signal indicates that the power line switch 10 is OFF. In this case, the conductivity type determination circuit 30 determines that the power line switch 10 is the N-type MOS device and generates the determination signal Vd, whereby the gate driver circuit 40 selects the NMOS driver circuit 42 to operate the power line switch 10 according to the determination signal Vd during the normal operation period.

In one embodiment, after the integrated circuit (IC) of the switching regulator 4000 is actuated, the determination period is not immediately entered until a waiting period (e.g., as shown by the interval Tw in FIG. 6A and FIG. 6B) has passed by. After the waiting period, the control circuit 202 enters the determination period to determine a conductivity type of the power line switch 10.

Figure 7:
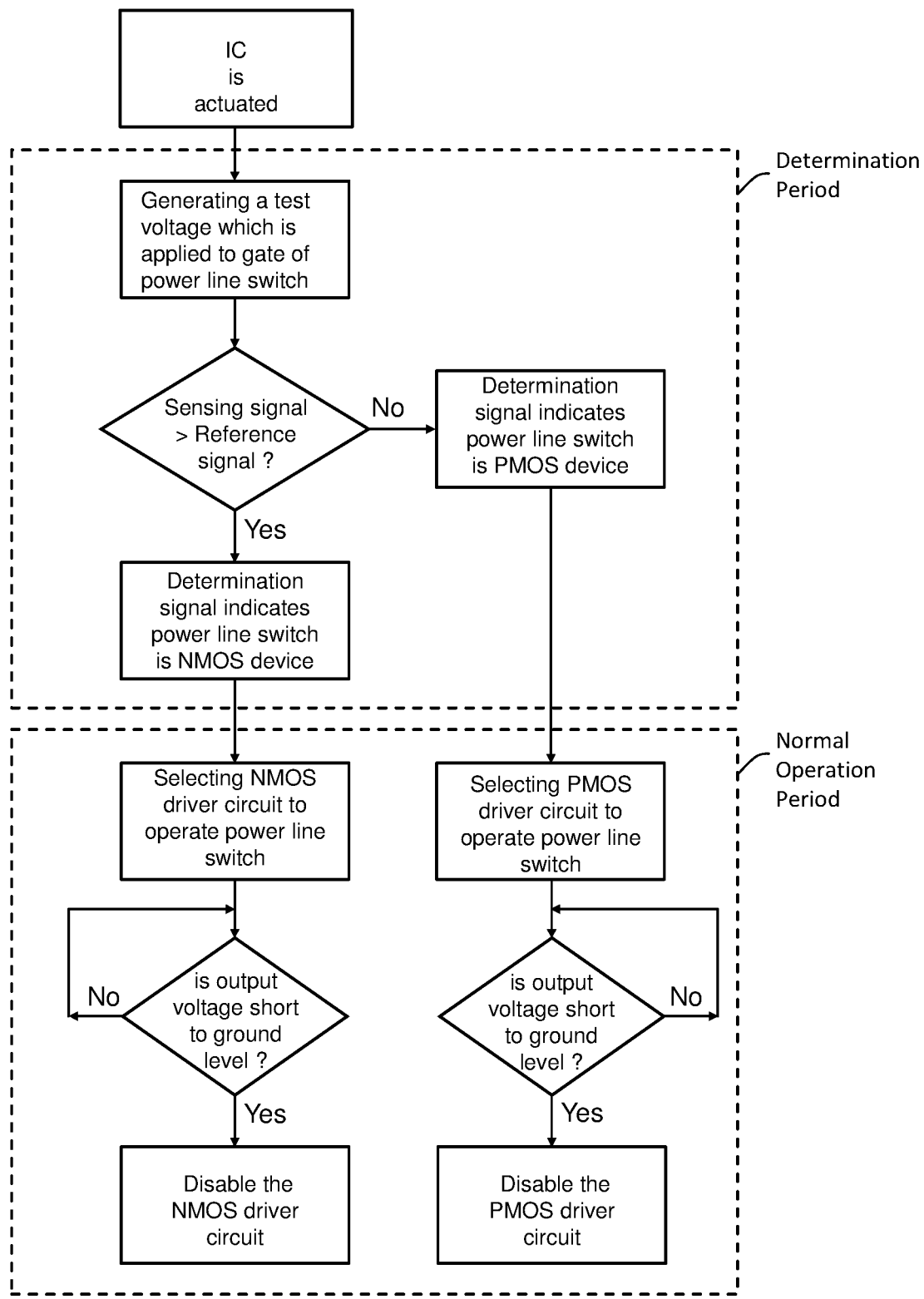
FIG. 7 shows a flowchart diagram of a control method corresponding to a switching regulator of FIG. 4 according to another specific embodiment of the present invention.

Please refer to FIG. 4 along with FIG. 7. FIG. 7 shows a flowchart diagram of a control method corresponding to the switching regulator of FIG. 4 according to another specific embodiment of the present invention. In one specific embodiment, during the determination period, the control circuit 202 of FIG. 4 operates the NMOS driver circuit 42 to determine the conductivity type of the power line switch 10. Subsequently, during the normal operation period, the control circuit 202 of FIG. 4 selects to operate the PMOS driver circuit 41 or the NMOS driver circuit 42 according to the conductivity type of the power line switch 10. Specific operation procedures of this embodiment are elaborated as following:

After an integrated circuit (IC) of the switching regulator 4000 is actuated, the switching regulator 4000 enters the determination period. First, the charge pump gate driver 421 generates a test voltage which is applied to the gate of the power line switch 10, to generate a sensing signal. When the sensing signal indicates that the power line switch 10 is ON, the conductivity type determination circuit 30 determines that the power line switch 10 is the N-type MOS device, whereby the gate driver circuit 40 selects the NMOS driver circuit 42 to operate the power line switch 10 during the normal operation period; the gate driver circuit 40 also determine whether the output voltage Vout is short to ground level, and when the output voltage Vout is short to ground level, the gate driver circuit 40 disables the NMOS driver circuit 42 to turn OFF the power line switch 10, thereby preventing the load from being damaged. When the output voltage Vout is not short to ground level, the gate driver circuit 40 keeps selecting the NMOS driver circuit 42 to operate the power line switch 10 and keeps determining whether the output voltage Vout is short to ground level. On the other hand, when the sensing signal indicates that the power line switch 10 is OFF, the conductivity type determination circuit 30 determines that the power line switch 10 is the P-type MOS device, whereby the gate driver circuit 40 selects the PMOS driver circuit 41 to operate the power line switch 10 during the normal operation period, and the gate driver circuit 40 also determines whether the output voltage Vout is short to ground level; when the output voltage is short to ground level, the gate driver circuit 40 disables the PMOS driver circuit 41 to turn OFF the power line switch 10, thereby preventing the load from being damaged. When the output voltage Vout is not short to ground level, the gate driver circuit 40 keeps selecting the PMOS driver circuit 41 to operate the power line switch 10 and keeps determining whether the output voltage Vout is short to ground level.

Please still refer to FIG. 6A and FIG. 6B. In the aforementioned embodiments shown in FIG. 4 and FIG. 7, when the enable signal Ven enables the NMOS driver circuit 42 and when the sensing signal indicates that the power line switch 10 is ON, the corresponding signal waveform diagram is as shown in FIG. 6A. To elaborate in more detail, when the gate voltage Vsd of the power line switch 10 is higher than the corresponding reference signal Vf1, when the feedback signal Vfb is higher than the corresponding reference signal Vf2, when the input current related signal Vis is higher than the corresponding reference signal Vf3 and/or when the inductor current related signal Vsn is higher than the corresponding reference signal Vf4, the sensing signal indicates that the power line switch 10 is ON. In this case, the conductivity type determination circuit 30 determines that the power line switch 10 is the N-type MOS device and generates the determination signal Vd, whereby the gate driver circuit 40 selects the NMOS driver circuit 42 to operate the power line switch 10 according to the determination signal Vd during the normal operation period. On the other hand, in the aforementioned embodiments shown in FIG. 4 and FIG. 7, when the sensing signal indicates that the power line switch 10 is OFF, the corresponding signal waveform diagram is as shown in FIG. 6B. To elaborate in more detail, when the gate voltage Vsd of the power line switch 10 is lower than the corresponding reference signal Vf1, when the feedback signal Vfb is lower than the corresponding reference signal Vf2, when the input current related signal Vis is lower than the corresponding reference signal Vf3 and/or when the inductor current related signal Vsn is lower than the corresponding reference signal Vf4, the sensing signal indicates that the power line switch 10 is OFF. In this case, the conductivity type determination circuit 30 determines that the power line switch 10 is the P-type MOS device and generates the determination signal Vd, whereby the gate driver circuit 40 selects the PMOS driver circuit 41 to operate the power line switch 10 according to the determination signal Vd during the normal operation period.

Figure 8A:
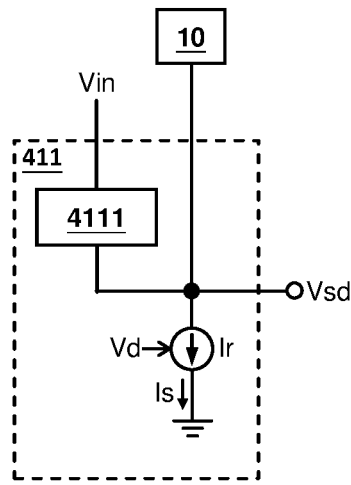
FIG. 8A and FIG. 8B show schematic diagrams of two other embodiments of a PMOS driver circuit in a switching regulator of FIG. 4, respectively.
Figure 8B:
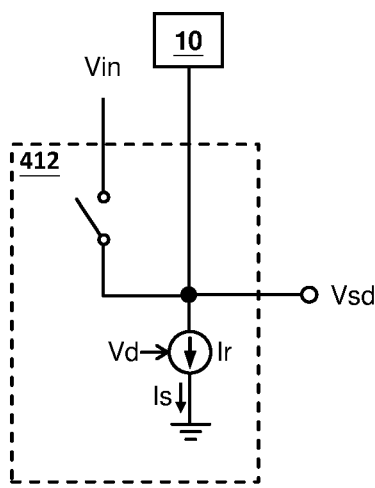
Figure 9A:
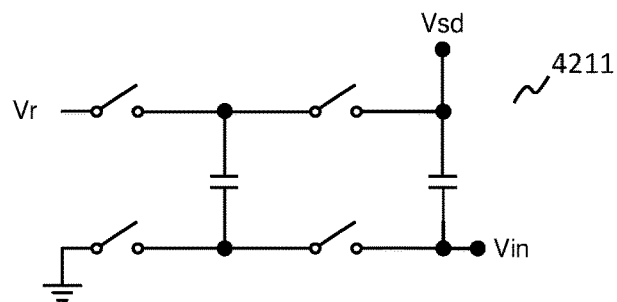
FIG. 9A to FIG. 9E show schematic diagrams of five embodiments of a charge pump gate driver of an NMOS driver circuit in a switching regulator of FIG. 4, respectively.
Figure 9B:
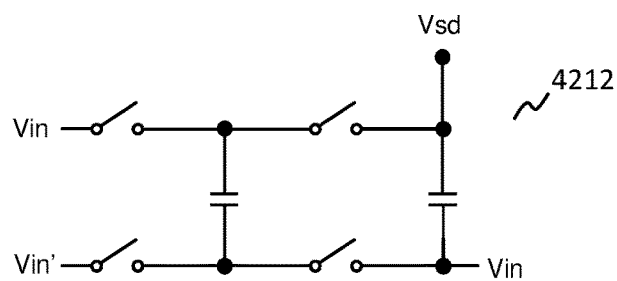
Figure 9C:
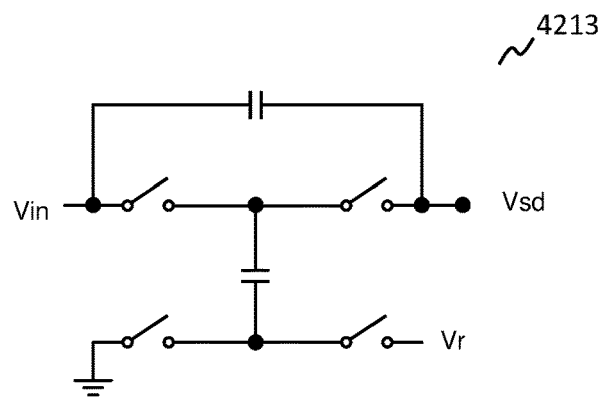
Figure 9D:
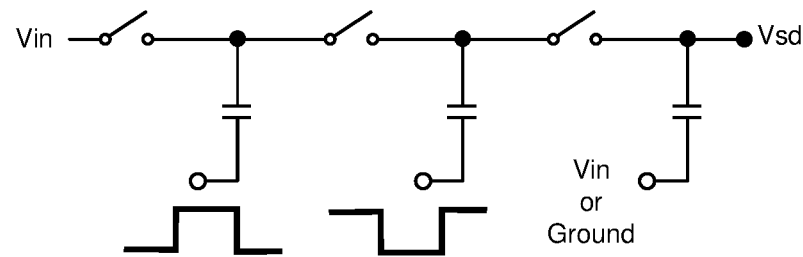
Figure 9E:
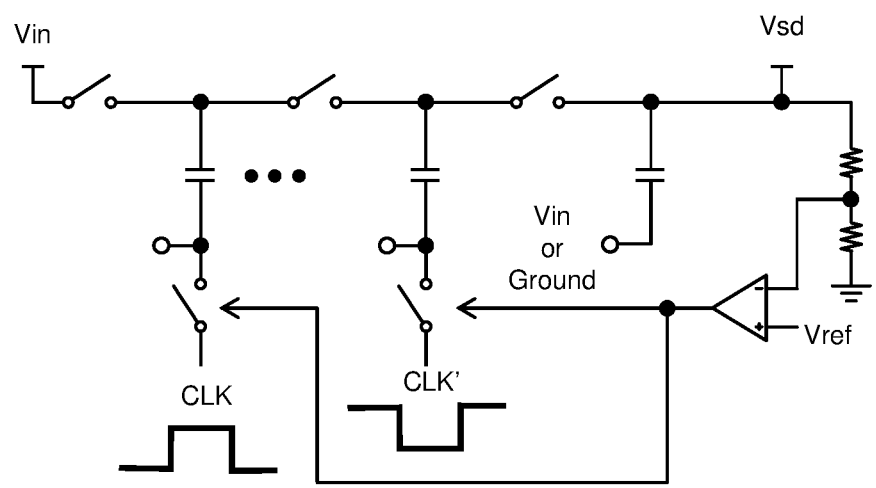

Please refer to FIG. 4 together with FIG. 8A and FIG. 8B. FIG. 8A and FIG. 8B show schematic diagrams of two other embodiments of a PMOS driver circuit in a switching regulator of FIG. 4, respectively. In addition to the circuit components shown in FIG. 4, the PMOS driver circuit 41 further includes: a voltage clamping gate driver, which serves to clamp the gate of the power line switch 10 to a specific level. In the embodiment shown in FIG. 4, the voltage clamping circuit is an IR clamping circuit constituted by a configuration wherein a current flows through a resistor and a current source Ir drains a current therefrom; when the power line switch 10 is a PMOS device, the power line switch 10 is turned ON. In one embodiment, the PMOS driver circuit of the present invention can be a diode clamping gate driver or a pull ground gate driver, which correspond to the PMOS driver circuit 411 of FIG. 8A and the PMOS driver circuit 412 of FIG. 8B, respectively. The PMOS driver circuit 411 of FIG. 8A is a diode clamping gate driver including: a diode device 4111 and a current source Ir, wherein the diode device 4111 can be, for example but not limited to, a Zener diode. The PMOS driver circuit 412 of FIG. 8B is a pull ground gate driver including: a switch and a current source Ir.

Please refer to FIG. 4 together with FIG. 9A to FIG. 9E. FIG. 9A to FIG. 9E show schematic diagrams of five embodiments of the charge pump gate driver of the NMOS driver circuit in a switching regulator of FIG. 4, respectively. The charge pump gate driver of the NMOS driver circuit in the present invention for example can be implemented as any of the following embodiments: a charge pump gate driver 4211 of FIG. 9A, a charge pump gate driver 4212 of FIG. 9B, a charge pump gate driver 4213 of FIG. 9C, a charge pump gate driver 4214 of FIG. 9D or a charge pump gate driver 4215 of FIG. 9E. In each above-mentioned embodiment, the switch can be a Schottky diode, a PN diode or a MOS device. The voltage Vr for example can be a voltage supplied by a low drop-out voltage regulator (LDO), wherein the voltage Vr is relatively lower than the output voltage Vout. The voltage Vin' is a voltage lower than an input voltage Vin. The reference voltage is a voltage related to the input voltage Vin, such as a divided voltage of the input voltage Vin. The clock signal CLK and the clock signal CLK' are clock signals complementary (i.e. in opposite phase) to each other.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching regulator comprising:
   a boost power stage circuit including:
   at least one power switch, which is configured to operably switch a terminal of an inductor according to an operation signal during a normal operation period, such that the terminal of the inductor is switched between an output voltage and ground level, thereby converting an input voltage to the output voltage; and
   a power line switch connected in series to the inductor between the input voltage and the output voltage, wherein the power line switch is turned OFF when the output voltage is short to ground level, so as to prevent a short current from flowing from the input voltage to ground level; and
   a control circuit, which is configured to operably generate the operation signal according to the output voltage and determine whether the power line switch is a P-type metal oxide semiconductor (MOS) device or an N-type MOS device, so as to turn OFF the power line switch when the output voltage is short to ground level.

2. The switching regulator of claim 1, wherein the control circuit includes:
   an operation signal generation circuit coupled to the boost power stage circuit, wherein the operation signal generation circuit is configured to operably generate the operation signal according to the output voltage;
   a conductivity type determination circuit coupled to the power line switch, wherein the conductivity type determination circuit is configured to operably determine whether the power line switch is a P-type MOS device or an N-type MOS device according to a sensing signal during a determination period, and is configured to operably generate a determination signal accordingly; and a gate driver circuit, which is configured to operably select one of a PMOS driver circuit and an NMOS driver circuit in the gate driver circuit according to the determination signal during the normal operation period, so as to operate the power line switch, and the gate driver circuit is configured to operably turn off the power line switch when the output voltage is short to ground level.

3. The switching regulator of claim 2, wherein the sensing signal includes one of or a combination of signals including one of the following:
a gate voltage of the power line switch;
an output voltage related signal;
an input current related signal; or
an inductor current related signal.

4. The switching regulator of claim 3, wherein the PMOS driver circuit includes: an IR clamping gate driver, a diode clamping gate driver or a pull ground gate driver.

5. The switching regulator of claim 4, wherein the PMOS driver circuit includes:
a current source coupled between a gate of the power line switch and ground level, wherein the current source is configured to operably generate a sinking current flowing to ground level during the determination period, so as to generate the sensing signal;
wherein when the sensing signal indicates that the power line switch is ON, the conductivity type determination circuit determines that the power line switch is the P-type MOS device, whereby the gate driver circuit selects the PMOS driver circuit to operate the power line switch, and when the output voltage is short to ground level, the gate driver circuit disables the PMOS driver circuit to turn OFF the power line switch;
wherein when the sensing signal indicates that the power line switch is OFF, the conductivity type determination circuit determines that the power line switch is the N-type MOS device, whereby the gate driver circuit selects the NMOS driver circuit to operate the power line switch, and when the output voltage is short to ground level, the gate driver circuit disables the NMOS driver circuit to turn OFF the power line switch.

6. The switching regulator of claim 3, wherein the NMOS driver circuit includes: a charge pump gate driver.

7. The switching regulator of claim 6, wherein the charge pump gate driver is coupled between a gate of the power line switch and ground level, wherein the charge pump gate driver is configured to operably generate a test voltage which is applied to the gate of the power line switch during the determination period, so as to generate the sensing signal;
wherein when the sensing signal indicates that the power line switch is ON, the conductivity type determination circuit determines that the power line switch is the N-type MOS device, whereby the gate driver circuit selects the NMOS driver circuit to operate the power line switch, and when the output voltage is short to ground level, the gate driver circuit disables the NMOS driver circuit to turn OFF the power line switch;
wherein when the sensing signal indicates the power line switch is OFF, the conductivity type determination circuit determines that the power line switch is the P-type MOS device, whereby the gate driver circuit selects the PMOS driver circuit to operate the power line switch, and when the output voltage is short to ground level, the gate driver circuit disables the PMOS driver circuit to turn OFF the power line switch.

8. The switching regulator of claim 1, wherein the control circuit is configured to operably determine whether the output voltage is short to ground level according to an output voltage related signal and/or an inductor current related signal during the normal operation period.

9. The switching regulator of claim 1, wherein the control circuit is configured to operably determine whether the power line switch is the P-type MOS device or the N-type MOS device according to an external signal, an interface signal, or a memory signal.

10. The switching regulator of claim 3, wherein the conductivity type determination circuit compares the sensing signal with a reference signal corresponding to the sensing signal, to generate the determination signal.

11. A control circuit, which is configured to operably a switching regulator; the control circuit comprising:
an operation signal generation circuit coupled to a boost power stage circuit of the switching regulator, wherein the operation signal generation circuit is configured to operably generate an operation signal according to an output voltage during a normal operation period, so as to switch at least one power switch of the boost power stage circuit, such that a terminal of an inductor is switched between the output voltage and ground level, thereby converting an input voltage to the output voltage;
a conductivity type determination circuit coupled to a power line switch of the boost power stage circuit, wherein the conductivity type determination circuit is configured to operably determine whether the power line switch is a P-type metal oxide semiconductor (MOS) device or an N-type MOS device according to a sensing signal during a determination period, and is configured to operably generate a determination signal accordingly; and
a gate driver circuit, which is configured to operably select one of a PMOS driver circuit and an NMOS driver circuit in the gate driver circuit according to the determination signal during the normal operation period, so as to operate the power line switch, and the gate driver circuit is configured to operably turn off the power line switch when the output voltage is short to ground level;
wherein the power line switch is connected in series to the inductor between the input voltage and the output voltage, and when the output voltage is short to ground level, the power line switch is turned OFF to prevent a short current from flowing from the input voltage to ground level.

12. The control circuit of claim 11, wherein the sensing signal includes one of or a combination of signals including one of the following:
a gate voltage of the power line switch;
an output voltage related signal;
an input current related signal; or
an inductor current related signal.

13. The control circuit of claim 12, wherein the PMOS driver circuit includes: an IR clamping gate driver, a diode clamping gate driver or a pull ground gate driver.

14. The control circuit of claim 13, wherein the PMOS driver circuit includes:

a current source coupled between a gate of the power line switch and ground level, wherein the current source is configured to operably generate a sinking current flowing to ground level during the determination period, so as to generate the sensing signal;

wherein when the sensing signal indicates that the power line switch is ON, the conductivity type determination circuit determines that the power line switch is the P-type MOS device, whereby the gate driver circuit selects the PMOS driver circuit to operate the power line switch, and when the output voltage is short to ground level, the gate driver circuit disables the PMOS driver circuit to turn OFF the power line switch;

wherein when the sensing signal indicates that the power line switch is OFF, the conductivity type determination circuit determines that the power line switch is the N-type MOS device, whereby the gate driver circuit selects the NMOS driver circuit to operate the power line switch, and when the output voltage is short to ground level, the gate driver circuit disables the NMOS driver circuit to turn OFF the power line switch.

15. The control circuit of claim 12, wherein the NMOS driver circuit includes: a charge pump gate driver.

16. The control circuit of claim 15, wherein the charge pump gate driver is coupled between a gate of the power line switch and ground level, wherein the charge pump gate driver is configured to operably generate a test voltage which is applied to the gate of the power line switch during the determination period, so as to generate the sensing signal;

wherein when the sensing signal indicates that the power line switch is ON, the conductivity type determination circuit determines that the power line switch is the N-type MOS device, whereby the gate driver circuit selects the NMOS driver circuit to operate the power line switch, and when the output voltage is short to ground level, the gate driver circuit disables the NMOS driver circuit to turn OFF the power line switch;

wherein when the sensing signal indicates the power line switch is OFF, the conductivity type determination circuit determines that the power line switch is the P-type MOS device, whereby the gate driver circuit selects the PMOS driver circuit to operate the power line switch, and when the output voltage is short to ground level, the gate driver circuit disables the PMOS driver circuit to turn OFF the power line switch.

17. The control circuit of claim 11, wherein the control circuit is configured to operably determine whether the output voltage is short to ground level according to an output voltage related signal and/or an inductor current related signal during the normal operation period.

18. The control circuit of claim 11, wherein the control circuit is configured to operably determine whether the power line switch is the P-type MOS device or the N-type MOS device according to an external signal, an interface signal, or a memory signal.

19. The control circuit of claim 12, wherein the conductivity type determination circuit compares the sensing signal with a reference signal corresponding to the sensing signal, to generate the determination signal.

20. A control method, which is configured to operably a switching regulator; the control method comprising steps of:

generating an operation signal according to an output voltage during a normal operation period, so as to switch at least one power switch of a boost power stage circuit in the switching regulator, such that a terminal of an inductor is switched between the output voltage and ground level, thereby converting an input voltage to the output voltage;

determining whether a power line switch of the boost power stage circuit is a P-type metal oxide semiconductor (MOS) device or an N-type MOS device according to a sensing signal during a determination period, to generate a determination signal; and selecting one of a PMOS driver circuit and an NMOS driver circuit in the gate driver circuit according to the determination signal during the normal operation period, so as to operate the power line switch and to turn off the power line switch when the output voltage is short to ground level;

wherein the power line switch is connected in series to the inductor between the input voltage and the output voltage, wherein when the output voltage is short to ground level, the power line switch is turned OFF to prevent a short current from flowing from the input voltage to ground level.

21. The control method of claim 20, wherein the sensing signal includes one of or a combination of signals including one of the following:

a gate voltage of the power line switch;
an output voltage related signal;
an input current related signal; or
an inductor current related signal.

22. The control method of claim 21, wherein the step of determining whether the power line switch of the boost power stage circuit is the P-type MOS device or the N-type MOS device according to a sensing signal during the determination period to generate the determination signal includes:

generating a sinking current flowing to ground level during the determination period, so as to generate the sensing signal;

wherein when the sensing signal indicates that the power line switch is ON, determining that the power line switch is the P-type MOS device, and selecting the PMOS driver circuit to operate the power line switch, wherein when the output voltage is short to ground level, the PMOS driver circuit is disabled to turn OFF the power line switch;

wherein when the sensing signal indicates that the power line switch is OFF, determining that the power line switch is the N-type MOS device, and selecting the NMOS driver circuit to operate the power line switch, wherein when the output voltage is short to ground level, the NMOS driver circuit is disabled to turn OFF the power line switch.

23. The control method of claim 21, wherein the step of determining whether the power line switch of the boost power stage circuit is the P-type MOS device or the N-type MOS device according to a sensing signal during the determination period to generate the determination signal includes:

generating a test voltage which is applied to the gate of the power line switch during the determination period, so as to generate the sensing signal;

wherein when the sensing signal indicates that the power line switch is ON, determining that the power line switch is the N-type MOS device, and selecting the NMOS driver circuit to operate the power line switch, wherein when the output voltage is short to ground level, the NMOS driver circuit is disabled to turn OFF the power line switch;

wherein when the sensing signal indicates that the power line switch is OFF, determining that the power line switch is the P-type MOS device, and selecting the PMOS driver circuit to operate the power line switch, wherein when the output voltage is short to ground level, the PMOS driver circuit is disabled to turn OFF the power line switch.

24. The control method of claim 21, further comprising:
determining whether the power line switch is the P-type MOS device or the N-type MOS device according to an external signal, an interface signal, or a memory signal.

25. The control method of claim 21, wherein the step of determining whether the power line switch of the boost power stage circuit is the P-type MOS device or the N-type MOS device according to a sensing signal during the determination period to generate the determination signal includes:
comparing the sensing signal with a reference signal corresponding to the sensing signal, to generate the determination signal.

* * * * *